US008854634B2

(12) United States Patent
Thayer et al.

(10) Patent No.: US 8,854,634 B2

(45) Date of Patent: Oct. 7, 2014

(54) TRANSFIX ROLLER WITH ADJUSTABLE CROWN FOR USE IN AN INDIRECT PRINTER

(75) Inventors: Bruce E. Thayer, Spencerport, NY (US); Bin Zhang, Penfield, NY (US); Palghat S. Ramesh, Pittsford, NY (US); Rachael L. McGrath, Churchville, NY (US); Christopher A. DiRubio, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 322 days.

(21) Appl. No.: 13/523,358

(22) Filed: Jun. 14, 2012

(65) Prior Publication Data

US 2013/0335752 A1 Dec. 19, 2013

(51) Int. Cl.
*G06K 15/02* (2006.01)

(52) U.S. Cl.
USPC .......... 358/1.1; 358/1.14; 358/1.15; 101/329; 101/250

(58) Field of Classification Search
None
See application file for complete search history.

(56) References Cited

U.S. PATENT DOCUMENTS

| | | | |
|---|---|---|---|
| 5,848,347 | A | 12/1998 | Kuo et al. |
| 7,578,586 | B2 | 8/2009 | Jones et al. |
| 2009/0232569 | A1 | 9/2009 | Ishino et al. |

*Primary Examiner* — Mark Zimmerman
*Assistant Examiner* — Darryl V Dottin
(74) *Attorney, Agent, or Firm* — Maginot, Moore & Beck, LLP

(57) ABSTRACT

An indirect printer includes a system for alternating the pressure in a transfer nip by manipulating the transfer roller. The system includes a pair of pivotable collars mounted about the ends of the transfer roller. The collars are pivoted towards or away from one another to bend the transfer roller and to increase or decrease, respectively, the pressure in the longitudinal center of the nip.

21 Claims, 10 Drawing Sheets

TRANSFIX ROLLER WITH ADJUSTABLE CROWN FOR USE IN AN INDIRECT PRINTER

TECHNICAL FIELD

The system described below relates to printers in which an ink image is transferred from a surface of an image receiving member to a recording medium, and, more particularly, to printers in which the image is transferred to the recording medium as the medium passes through a nip formed between a transfix roller and an image receiving member.

BACKGROUND

The word "printer" as used herein encompasses any apparatus, such as a digital copier, book marking machine, facsimile machine, multi-function machine, etc., that produces an image with a colorant on recording media for any purpose. Printers that form an image on an image receiving member and then transfer the image to recording media are referenced in this document as indirect printers. Indirect printers typically use intermediate transfer, transfix, or transfuse members to facilitate the transfer and, in the case of transfix and transfuse members, fusing of the image from the image receiving member to the recording media. In general, such printing systems typically include a colorant applicator, such as a printhead, that forms an image with colorant on the image receiving member. Recording medium is fed into a nip formed between the surface of the image receiving member and a transfix roller to enable the image to be transferred and fixed to the print medium so the image receiving member can be used for formation of another image.

A schematic diagram for a typical indirect printer that includes a printhead that ejects phase change ink on the image receiving member to form an image on the member is illustrated in FIG. 8. The solid ink imaging device, hereafter simply referred to as a printer 110, has an ink loader 112 that receives and stages solid ink sticks. The ink sticks progress through a feed channel of the loader 112 until they reach an ink melt unit 114. The ink melt unit 114 heats the portion of an ink stick impinging on the ink melt unit 114 to a temperature at which the ink stick melts. The liquefied ink is supplied to one or more printheads 116 by gravity, pump action, or both. Printer controller 122 uses image data to be reproduced on media to control the printheads 116 and eject ink onto a rotating print drum or image receiving member 140 as image pixels to form an ink image. Recording media 120, such as paper or other recording substrates, are fed from a sheet feeder 118 to a position where the ink image on the image receiving member 140 can be transferred to the media. To facilitate the image transfer process, the media 120 are fed into a nip between the transfer, sometimes called transfix roller 150, and the rotating image receiving member 140. In the nip, the transfix roller 150 presses the media 120 against the image receiving member 140. An assembly 124 of lever arms, camshafts, cams, and gears urged into motion by an electrical motor responds to signals from the controller 122 to move the transfix roller into and out of engagement with the image receiving member 140. Indirect or offset printing refers to a process, such as the one just described, of generating an ink or toner image on an intermediate member and then transferring the image onto some recording media or another member.

To optimize image resolution in an indirect printer, the conditions within the nip are carefully controlled. The transferred ink drops should spread out to cover a specific area to preserve image resolution. Too little spreading leaves gaps between the ink drops while too much spreading results in intermingling of the ink drops. Additionally, the nip conditions are controlled to maximize the transfer of ink drops from the image member to the print medium without compromising the spread of the ink drops on the print medium. Moreover, the ink drops should be pressed into the paper with sufficient pressure to prevent their inadvertent removal by abrasion thereby optimizing printed image durability. Thus, the temperature and pressure conditions are important parameters for image quality and need to be carefully controlled throughout the nip.

The image receiving member 140 is a hollow cylinder mounted about a shaft that is supported on its ends by stiff endbells incorporated into the shaft. The shaft of the image receiving member 140 deflects under the pressure of the transfix roller 150 at the nip 144. Some deflection of the image receiving member 140 is inherent. Because the shaft of the image receiving member 140 is supported only at the endbells, it deflects more in the middle than at the ends and, thus, applies more pressure to the nip 144 at the ends than at the middle. However, too much deflection by the image receiving member 140 diminishes the quality of the print because of inconsistencies in the pressure at the nip 144. The thickness of the image receiving member 140 is selected to require as little material as possible to provide desirable thermal properties for the imaging surface, which are described below, and to keep manufacturing costs down. However, the thickness of the image receiving member 140 is also selected so that, under pressure from the transfix roller 150 at the nip 144, it does not deflect so much that it diminishes the quality of the print.

The transfix roller 150 includes a cylinder mounted about a shaft and is formed of steel, or another material with similar properties. As described above with reference to the image receiving member 140, the transfix roller 150 deflects more in the middle than at the ends because it is supported only at the ends. The variation in deflection along the length of the transfix roller 150 results in variation of the pressure along the length of the nip 144. The thickness of the transfix roller 150, like that of the image receiving member 140, is selected to balance material costs with the amount of deflection along the transfix roller 150.

When an indirect printer, such as the one shown in FIG. 8, is powered on, the image receiving member needs to be heated to a predetermined temperature that enables the melted phase change ink to remain on the surface of the image receiving member, yet be malleable enough for transfer and fixing to the recording media when the ink image enters the nip. An image receiving member with a larger thermal mass requires more thermal energy and more time to reach the predetermined temperature than an image receiving member that has a smaller thermal mass. One way to reduce the time required for an image receiving member to reach the predetermined temperature is to reduce the thickness of the wall of the image receiving member. While this reduction in wall thickness does decrease the time required for the image receiving member to reach the predetermined temperature, it also affects the pressure conditions in the nip formed with the transfix roller. Without a change to the transfix roller, the pressure in the nip becomes less uniform and weaker in the center of the nip between the ends of the transfix roller and the image receiving member, especially as the walls of the image receiving member are thinned.

As shown in FIG. 9, a nip formed with an image receiving member having a relatively thick wall (for example, 9 mm) has one pressure profile from one end to the other end of the nip across the width of the transfix roller and image receiving member, while a nip formed with an image receiving member having a relatively thin wall (for example, 4.5 mm) has another profile. Whether a wall is considered relatively thick or thin depends on the length of the image receiving member, the material with which the image receiving member is made, and the level of pressure required in the transfix nip. As used in this document, a "thin wall" refers to a wall of a roller having a thickness that is 5 mm or less, while a "thick wall" refers to a wall of a roller having a thickness that is 8.5 mm or more for an aluminum roller approximately 345 mm long and generating a minimum peak nip pressure of about 7 MPa. The ends of the nip 144 correspond to the ends of the image receiving members 140 and the transfix rollers 150. The pressure profile for the thin wall image receiving member has a pressure at each end of the profile that is greater than the pressure at each end of the profile for the thick wall image receiving member. The pressure is highest at the ends of the nips 144 because the image receiving members 140 and the transfix rollers 150 are supported at the ends and are the most rigid at those areas. Additionally, the pressure in the center of the thin wall image receiving member profile is substantially below the pressure in the center of the thick wall image receiving member profile. The pressure is lowest at the middle of the nips 144 because the image receiving members 140 and the transfix rollers 150 deflect the most at the middle, the area that is the farthest from the supported ends. These pressure differences across the length of the nip can cause wrinkles in the recording media and corresponding print quality defects.

One way to modify the nip conditions to help ensure the print quality is adequate and the media is not distorted with thinner wall image receiving members is to add a crown to the transfix roller. As shown in FIG. 10, a crown 160 is a convex profile formed in the elastomer coat 153 of the transfix roller 150. Accordingly, the diameter 190 of the transfix roller 150 is largest at the middle of the crown 160. The crown 160 provides additional interference to the center of the transfix roller 150, increasing pressure at the center of the nip and compensating for the decreased pressure in the center of the nip generated by the thinner wall of the image receiving member. As the wall of the image receiving member is made thinner, the crown of the transfix roller needs to be larger to compensate for the additional image receiving member deflection. The height of a crown, however, is limited by practical constraints in manufacturing and usage.

Additionally, the height of a crown can generate wrinkles and/or image quality defects when print conditions are particularly likely to form either transverse or longitudinal wrinkles. Longitudinal wrinkles are formed in the print media in a direction parallel to the direction that print media is fed through the nip (also known as the process direction). One print condition that is likely to generate longitudinal wrinkles is the center of the print media moving through the nip at a faster rate than the edges of the print media. This condition can result from a crown that is not high enough to compensate for the greater deflection, and resulting lower pressure, in the center of the nip. This condition can also result from high density, process direction images along the edges of the print. Another condition that is likely to generate longitudinal wrinkles is print media being A3 or a similar size. Another condition that is likely to generate longitudinal wrinkles is the orientation of the paper grain in a direction perpendicular to the direction that the print media is fed through the nip (also known as the cross-process direction). Increasing the pressure applied at the center of the nip reduces the occurrence of longitudinal wrinkles.

Transverse wrinkles are formed in the print media in the cross-process direction. One print condition that is likely to generate transverse wrinkles is the edges of the print media moving through the nip at a faster rate than the center of the print media. This condition can result from a crown that is too high and overcompensates for the deflection, resulting in high pressure, in the center of the nip. This condition can also result from high density, process direction images in the center of the print or over the entire print. Another condition that is likely to generate transverse wrinkles is the print media being A3 or a similar size. Another condition that is likely to generate transverse wrinkles is a process direction orientation of the paper grain. Decreasing the pressure applied at the center of the nip reduces the occurrence of transverse wrinkles.

As described above, longitudinal wrinkles and transverse wrinkles can be generated by opposite conditions and, thus be reduced by opposite adjustments. Accordingly, enabling adjustment of the pressure along the nip when print conditions include stresses likely to generate longitudinal or transverse wrinkles is a desirable goal.

SUMMARY

An indirect printer has been developed that can selectively bend a transfer roller to regulate the pressure in a transfer nip more precisely. The indirect printer includes a first roller, a second roller, a first pivotable collar and a second pivotable collar. The second roller has a first end and a second end, and is configured to move into and out of engagement with the first roller to apply pressure to the first roller. The first pivotable collar supports the first end of the second roller and is configured to apply a first moment to the first end of the second roller. The second pivotable collar supports the second end of the second roller and is configured to apply a second moment to the second end of the second roller.

A roller assembly has been developed for removable insertion in an indirect printer that enables pressure in a transfer nip to be regulated more precisely. The roller assembly includes a thin wall roller, a first pivotable collar, a second pivotable collar, and an actuator. The thin wall roller has a first end and a second end. The first pivotable collar supports the first end of the roller and is configured to apply a first moment to the first end of the roller. The second pivotable collar supports the second end of the roller and is configured to apply a second moment to the second end of the roller. The actuator is operatively connected to the first collar and the second collar and is configured to pivot the first collar and the second collar to apply the first and second moments to the first and second ends of the roller.

DETAILED DESCRIPTION

Figure 1:
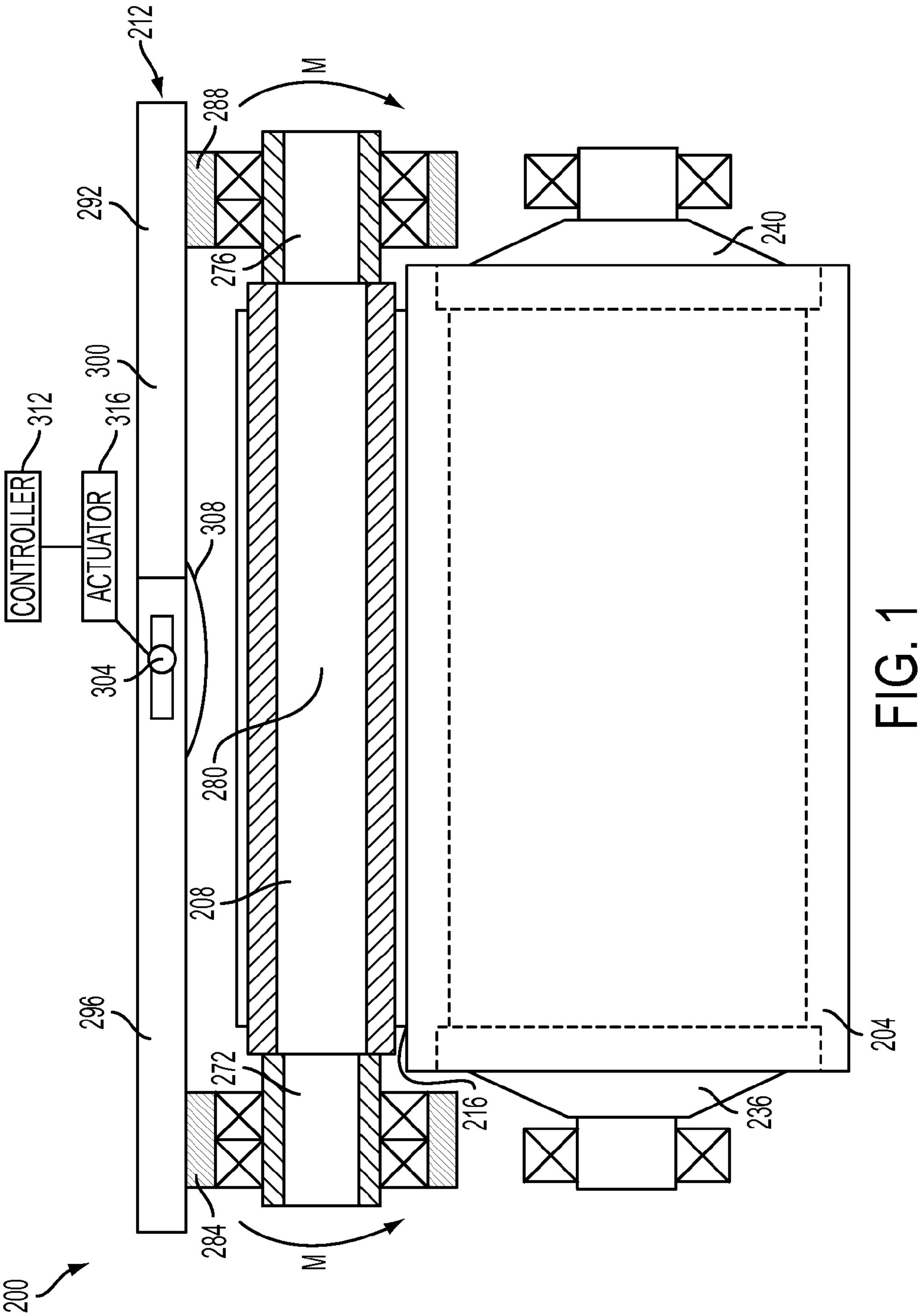
FIG. 1 depicts an image transfer system having an image receiving member, a transfix roller, and a support assembly to be used in an indirect printer.

The image transfer system 200 shown in FIG. 1 includes an image receiving member 204, a transfix roller 208 and a support assembly 212 that adjusts the deflection at the center of the transfix roller 208 and the pressure variation along the nip 216. The transfix roller 208 is configured in a known manner to be moved into and out of engagement with the image receiving member 204. The transfix roller 208 is configured to apply pressure to the image receiving member 204 and form the nip 216 for the transfer of the ink images from the image receiving member 204 to media passing through the nip 216. The support assembly 212 is configured to apply varying amounts of pressure to the central area and the end portions of the transfix roller 208. The pressure applied to the transfix roller 208 by the support assembly 212 is transferred through the transfix roller 208 to the image receiving member 204 at the nip 216.

Figure 2:
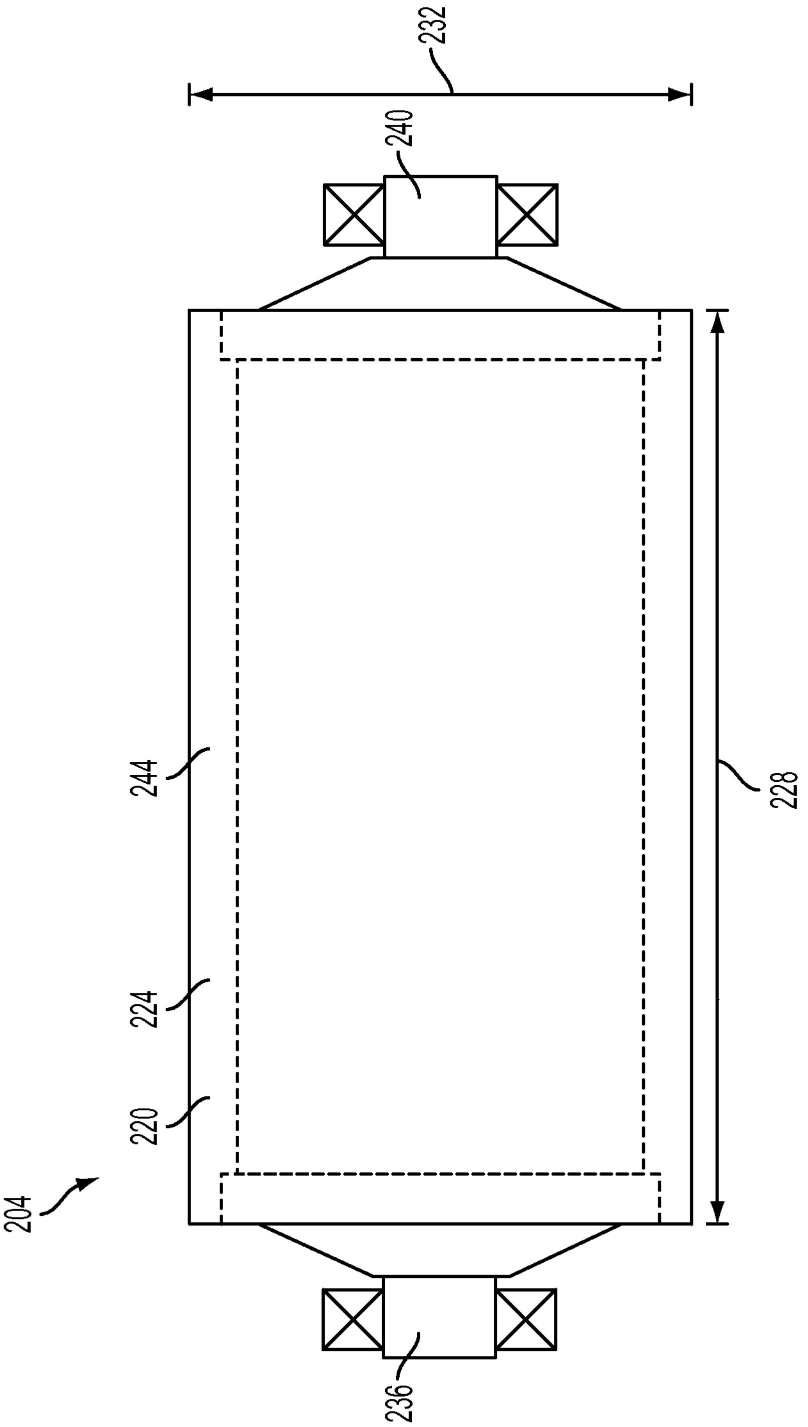
FIG. 2 is a cross-sectional view of the image receiving member of FIG. 1.

FIG. 2 depicts detailed features of the image receiving member 204 including an image receiving member wall 220 forming an image receiving member body 224. The image receiving member body 224 is cylindrically shaped and has an image receiving member length 228 and an image receiving member diameter 232. The image receiving member 204 also has a first image receiving member end 236 and an opposite second image receiving member end 240. Between the first image receiving member end 236 and the second image receiving member end 240 is an image receiving member central portion 244 that is approximately equidistant between the first image receiving member end 236 and the second image receiving member end 240.

The image receiving member 204 is made of aluminum or of some other material having similar thermal, mechanical and hardness properties. The surface of the image receiving member 204 is one to which ink temporarily adheres upon ejection from a printhead and also one from which ink can be transferred to print media upon application of pressure and heat at the nip 216 (shown in FIG. 1). The image receiving member wall 220 is symmetrical because it rotates to receive ink from the ink applying device, which is configured to form ink images on the image receiving member wall 220, and then deposit the ink on recording media passing through the nip 216 (shown in FIG. 1). The image receiving member length 228 is approximately 13.6 inches to accommodate standard sheets of printing paper as the print media. The image receiving member diameter 232 should be large enough to enable efficient transfer of ink from the image receiving member 204 to the print media as the print media passes through the nip 216 (shown in FIG. 1). For example, if the image receiving member diameter 232 is about 6.33 inches, the image receiving member 204 has a circumference of 19.9 inches and can make one full rotation per printed page for an 11" by 17" sheet of printing paper or two 8.5" by 11" sheets of paper. The image receiving member 204 in FIG. 1 and FIG. 2 has a diameter of about 6.33 inches and has a circumference of 19.9 inches. In other embodiments of the image receiving member described herein, the member has other commonly known diameters, circumferences, and lengths.

Figure 3:
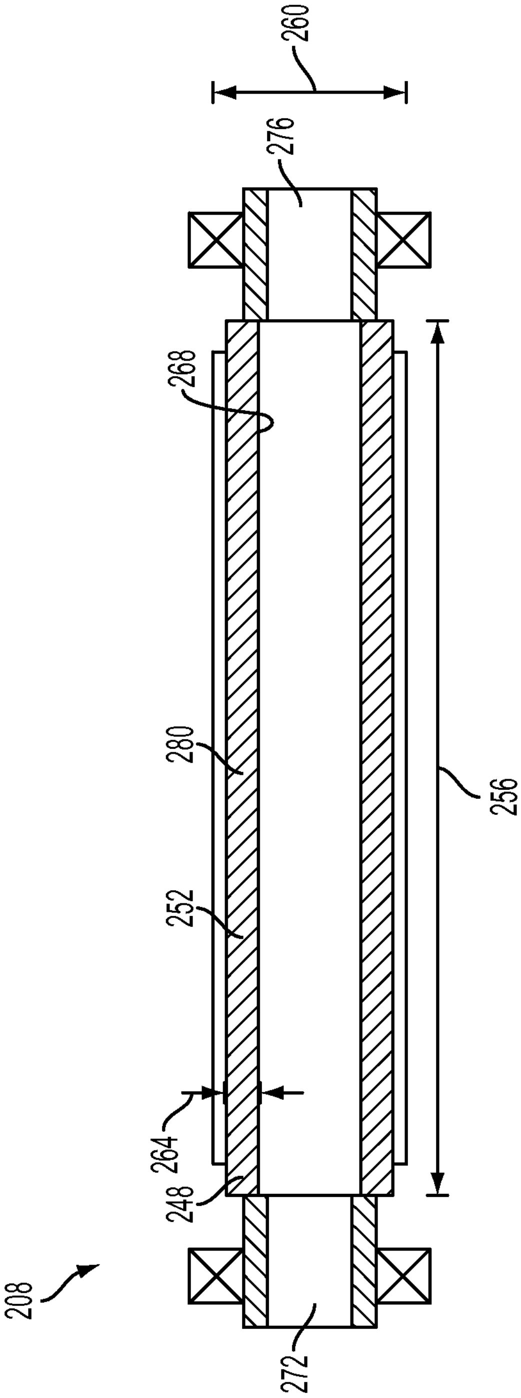
FIG. 3 is a cross-sectional view of the transfix roller of FIG. 1.

FIG. 3 depicts detailed features of the transfix roller 208 including a transfix roller wall 248 having a transfix roller body 252 with a transfix roller length 256 and a transfix roller diameter 260. The transfix roller wall 248 has a thickness 264. The transfix roller body 252 is cylindrically shaped and defines a longitudinal opening 268 therethrough. The transfix roller 208 further includes a first transfix roller end 272 and an opposite second transfix roller end 276. Between the first transfix roller end 272 and the second transfix roller end 276 is a transfix roller central portion 280.

The transfix roller length 256 is approximately 13.6 inches long to apply pressure evenly along the width of standard sheets of printing paper as the print media. In other words, the transfix roller length 256 is substantially equal to the image receiving member length 228 (shown in FIG. 2). The transfix roller diameter 260 does not need to be as large as the image receiving member diameter 232 (shown in FIG. 2) because the transfix roller 208 is used to apply pressure to transfer ink from only a portion of the image receiving member 204 to the print media. Thus, the transfix roller 208 can have a circumference of less than 19.9 inches and can rotate at a higher frequency than the image receiving member 204.

Figure 8:
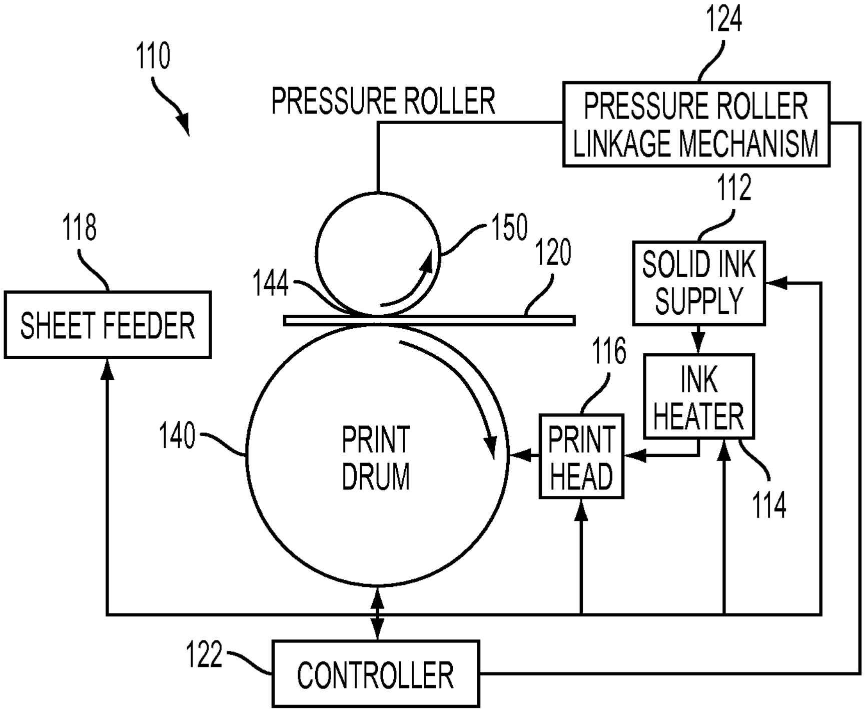
FIG. 8 PRIOR ART
FIG. 8 depicts a typical indirect printer capable of utilizing one of the image transfer systems depicted in FIG. 1 or 5.
Figure 9:
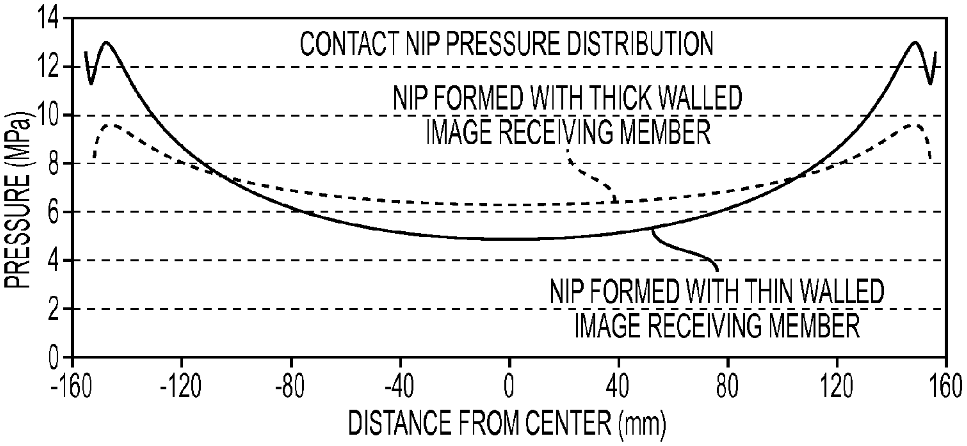
FIG. 9 PRIOR ART
FIG. 9 depicts a graph of a pressure gradient along a nip in a typical indirect printer.

The transfix roller 208 is slightly more flexible than the transfix roller 150 (shown in FIG. 8). The transfix roller 208 can be made more flexible than the transfix roller 150 by thinning the walls of the roller 150 to the thickness 264 of the walls 248 of the transfix roller body 252. For example, the thickness 264 of the walls 248 can be reduced from approximately 11.6 mm to approximately 2.6 mm. Alternatively, the transfix roller 208 can be made more flexible than the transfix roller 150 by making the transfix roller body 252 out of a material having a lower elastic modulus than steel. Alternatively, the transfix roller 208 can be made more flexible than the transfix roller 150 by thinning the walls 248 and making the transfix roller body 252 out of a material having a lower elastic modulus than steel. The flexibility of the transfix roller 208 enables it to receive and distribute loads applied at various points along the transfix roller length 256 to generate a more uniform pressure at the nip 216 (shown in FIG. 1).

Figure 4A:
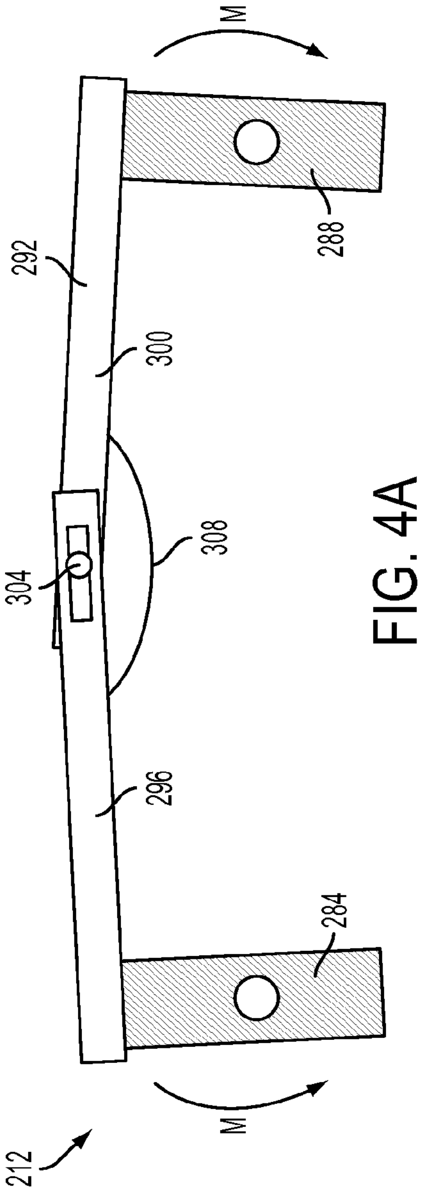
FIG. 4A depicts the support assembly of FIG. 1 in a concave position.
Figure 4B:
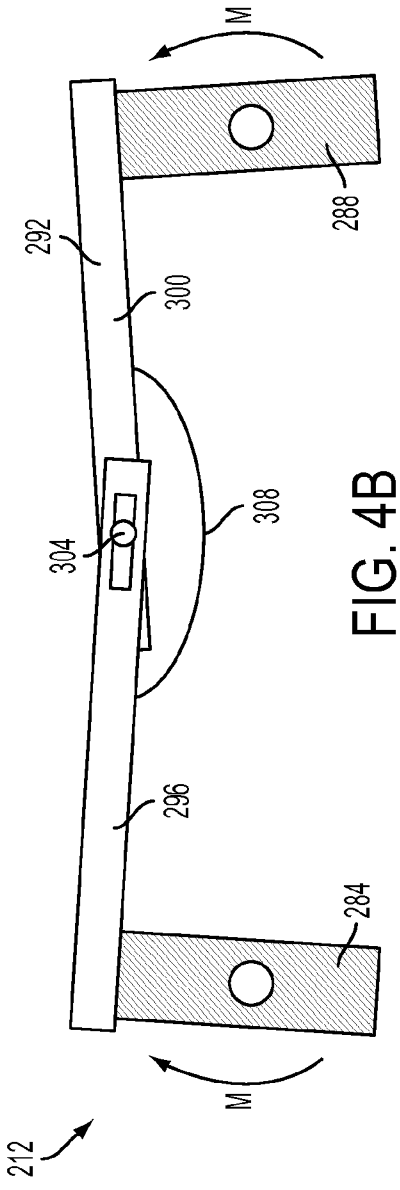
FIG. 4B depicts the support assembly of FIG. 1 in a convex position.

FIG. 4A and FIG. 4B depict detailed features of the support assembly 212 including a first pivotable collar 284, a second pivotable collar 288, and a support member 292. The first pivotable collar 284 pivotably supports the first transfix roller end 272 (shown in FIG. 3) while still allowing the transfix roller 208 to rotate relative to the nip 216 (shown in FIG. 1). Similarly, the second pivotable collar 288 pivotably supports the second transfix roller end 276 (shown in FIG. 3) while still allowing the transfix roller 208 to rotate relative to the nip 216 (shown in FIG. 1). The support member 292 has a first end 296 and an opposite second end 300 coupled together at a pivot connection 304. The first end 296 is fixedly coupled to the first pivotable collar 284 and the second end 300 is fixedly coupled to the second pivotable collar 288. The first end 296 and the second end 300 of the support member 292 define an angle 308 between them and are able to pivot at the pivot connection 304 to change the angle 308.

When the angle 308 between the first end 296 and the second end 300 is changed, the angles of the first pivotable collar 284 and the second pivotable collar 288 also change. As shown in FIG. 4A, when the angle 308 is less than 180 degrees, the support member 292 is in a concave position relative to the transfix roller 208 (shown in FIG. 3) and the first pivotable collar 284 and the second pivotable collar 288 are angled toward each other. Conversely, as shown in FIG. 4B, when the angle 308 is greater than 180 degrees, the support member 292 is in a convex position relative to the transfix roller 208 (shown in FIG. 3) and the first pivotable collar 284 and the second pivotable collar 288 are angled away from each other. In alternative embodiments, the first and second pivotable collars 284, 288 can be angled toward or away from each other using different mechanisms. For example, cams, gears, or hydraulic pistons directly applying force to the support ends can be used to angle the first and second pivotable collars 284, 288.

Returning now to FIG. 1, the image transfer system 200 further includes a controller 312 and a support member actuator 316. The support member actuator 316 is operatively connected to the pivot connection 304 of the support member 292 and to the controller 312. The controller 312 is configured to operate the support member actuator 316 to move the pivot connection 304 and change the angle 308 between the first end 296 and the second end 300 of the support member 292. The controller 312 is also configured to operate the support member actuator 316 to apply downward pressure to the first pivotable collar 284 and the second pivotable collar 288.

Thus, the support member actuator 316 is configured to apply a moment M to each of the first and second pivotable collars 284, 288. Each moment M consists of an amount of force, supplied in the form of pressure from the support member actuator 316, and a tendency to rotate in one direction, determined by the angle 308. Accordingly, the moments M of the first and second pivotable collars 284, 288 are equal in force and opposite in direction, one having a tendency to rotate in a counterclockwise direction and the other having a tendency to rotate in a clockwise direction.

The moments M of the first and second pivotable collars 284, 288 are applied to the first and second transfix roller ends 272, 276 to bend the transfix roller 208. When the angle 308 is less than 180 degrees, the transfix roller 208 is bent such that the first and second transfix roller ends 272, 276 are closer to the image receiving member 204 than the transfix roller central portion 280. Accordingly, the pressure generated by the transfix roller 208 is greater at the ends of the nip 216 than in the middle. Conversely, when the angle 308 is greater than 180 degrees, the transfix roller 208 is bent such that the first and second transfix roller ends 272, 276 are farther from the image receiving member 204 than the transfix roller central portion 280. Accordingly, the pressure generated by the transfix roller 208 is greater in the middle of the nip 216 than at the ends.

The controller 312 is further configured to receive data pertaining to print conditions that are likely to generate longitudinal wrinkles or are likely to generate transverse wrinkles. The data can include a longitudinal stress parameter or a transverse stress parameter such as, for example, a paper type or an amount and distribution of ink to be used to print an image. In particular, data pertaining to the paper type can include paper size, stiffness, and grain direction. Data pertaining to the amount and distribution of ink to be used can include the location of ink on the page, ink density at the center of the page, ink density at the edges of the page, and ink density across the whole page. The controller 312 is configured to use these data to identify a wrinkle parameter for an ink image to be printed.

The controller 312 is configured to operate the support member actuator 316 with reference to the identified wrinkle parameter for an ink image. In particular, the controller 312 is configured to adjust the pressure applied to the image receiving member 204 along the nip 216 by the bending the transfix roller 208. Bending the transfix roller 208 can regulate the pressure applied along the length of the nip 216 to avoid generating wrinkles during printing. For example, bending the transfix roller 208 so that the transfix roller central portion 280 is positioned approximately 50-100 micrometers closer to the image receiving member 204 than the ends of the roller can eliminate transverse wrinkles. Conversely, for example, bending the transfix roller 208 so that the transfix roller central portion 280 is positioned approximately 50-100 micrometers farther from the image receiving member 204 than the ends of the roller can eliminate longitudinal wrinkles. Additionally, these adjustments can be made while the printer is in operation, avoiding time-consuming reprinting or manual adjustment of the image transfer system 200.

The controller 312 can be configured with electronic components and programmed instructions stored in a memory operatively connected to or made part of the controller. In response to the controller 312 executing the programmed instructions and operating the electronic components, the controller receives data, such as the data described above, and identifies a wrinkle parameter for an image to be printed. In one embodiment, the controller 312 can be configured to receive data from a user interface operatively connected to the controller 312 and operated by a user. The user identifies printed pages that are wrinkled and then enters information about each wrinkled page into the user interface. The user can enter information about, for example, the paper type, the amount and distribution of the ink, the presence of longitudinal wrinkles, and the presence of transverse wrinkles. The controller 312 adjusts the pressure along the nip 216 with respect to the information entered into the user interface and reprints the pages. Alternatively, the printer can scan printed pages with an optical sensor mounted within the printer (not shown) and a processor within the printer can execute programmed instructions to analyze the image data produced by the optical sensor to detect wrinkles. The controller 312 is operatively connected to this processor to receive the image data analysis for control of the transfer roller.

In another embodiment, the controller 312 can be configured to receive data pertaining to images to be printed prior to printing. The controller 312 can then adjust the pressure at the nip 216 with respect to the data to avoid printing wrinkled pages. Before commencing printing, the paper size, stiffness, and grain direction for the pages to be printed can each be entered manually or the information can be stored within the controller 312 and identified according to the paper type entered by the user. Additionally, the printer can generate electronic image information for images to be printed, including, for example, the location of ink on the page or the ink density at the center and the edges of the page and over the whole page. The controller 312 can use the data pertaining to the paper type and to the amount and distribution of the ink to identify wrinkle parameters for the images to be printed and adjust the pressure applied along the nip 216 to compensate for the wrinkle parameters and prevent wrinkled prints.

In another embodiment, the controller 312 can be configured to store data received from the user interface or from within the printer in a memory. The controller 312 can thus generate a catalog of data and wrinkle parameters and use the catalog to identify conditions of new print jobs that are likely to generate wrinkled prints and adjust the pressure along the nip 216 accordingly. The controller 312 can, thus, gradually eliminate the need to receive data pertaining to wrinkle parameters from a user. Additionally, the controller 312 can be configured to receive the data from a network connected to other printers. The catalogs of the printers in the network can be combined to identify a greater number of conditions likely to generate wrinkled prints and the controller 312 can receive data from the combined catalog.

With continued reference to FIG. 1, in operation, the image transfer system 200 applies pressure to both the edges and the center of the nip 216 and varies the amount of pressure applied along the nip 216 to prevent the formation of longitudinal and transverse wrinkles. The controller 312 operates the support member actuator 316 to change the angle 308 between the first and second ends 296, 300 of the support member 292 and to apply downward pressure to the first and second pivotable collars 284, 288. The angle 308 between the first and second ends 296, 300 of the support member 292 determines the directional tendency of each of the first and second pivotable collars 284, 288 and the first pivotable collar 284 applies the moment M to the first transfix roller end 272 and the second pivotable collar 288 applies the moment M to the second transfix roller end 276. The moments M move the first and second transfix roller ends 272, 276 toward or away from the first and second image receiving member ends 236, 240 and move the transfix roller central portion 280 oppositely. The controller 312 thereby moves the transfix roller 208 into engagement with the image receiving member 204 to form the nip 216. Accordingly, a transfix roller 208 with thinner walls can be used with fewer concerns about the transfix roller 208 being too flexible and being unable to apply an appropriate distribution of pressure to the image receiving member 204 at the nip 216. As mentioned above, and shown in FIG. 3, the walls 248 can have a thickness 264 of, for example, 2.6 mm.

The controller 312 regulates the amount of pressure applied to the image receiving member 204 along the nip 216 by controlling the force exerted by the support member actuator 316 upon the first and second pivotable collars 284, 288 and regulates the location of the pressure applied to the image receiving member 204 along the nip 216 by controlling the angle 308 between the first and second ends 296, 300 of the support member 292. Thus, the controller 312 simultaneously controls the amount and location of pressure applied to the image receiving member 204 at both the ends and the center of the nip 216 while media moves through the nip 216. The amount of pressure applied by the transfix roller 208 to the ends of the nip 216 can be different than the amount of pressure applied by the transfix roller 208 to the center of the nip 216. Additionally, the controller 312 can vary the amounts of pressure applied to the ends and/or to the center of the nip 216 as necessary during operation of the printer to achieve and maintain the desired load along the length of the nip 216.

The controller 312 receives data to identify the wrinkle parameter for an image to be printed on the specified media. The controller 312 then operates the support member actuator 316 with reference to the identified wrinkle parameter. When the identified wrinkle parameter indicates that the image to be printed on the specified media includes stresses likely to generate longitudinal wrinkles, the controller 312 operates the support member actuator 316 such that the amount of pressure applied to the image receiving member 204 at the center of the nip 316 by the transfix roller 208 is increased relative to the amount of pressure applied to the image receiving member 204 at the ends of the nip 216 by the transfix roller 208. Conversely, when the identified wrinkle parameter indicates that the image to be printed on the specified media includes stresses likely to generate transverse wrinkles, the controller 312 operates the support member actuator 316 such that the amount of pressure applied to the image receiving member 204 at the center of the nip 316 by the transfix roller 208 is decreased relative to the amount of pressure applied to the image receiving member 204 at the ends of the nip 216 by the transfix roller 208.

Figure 5:
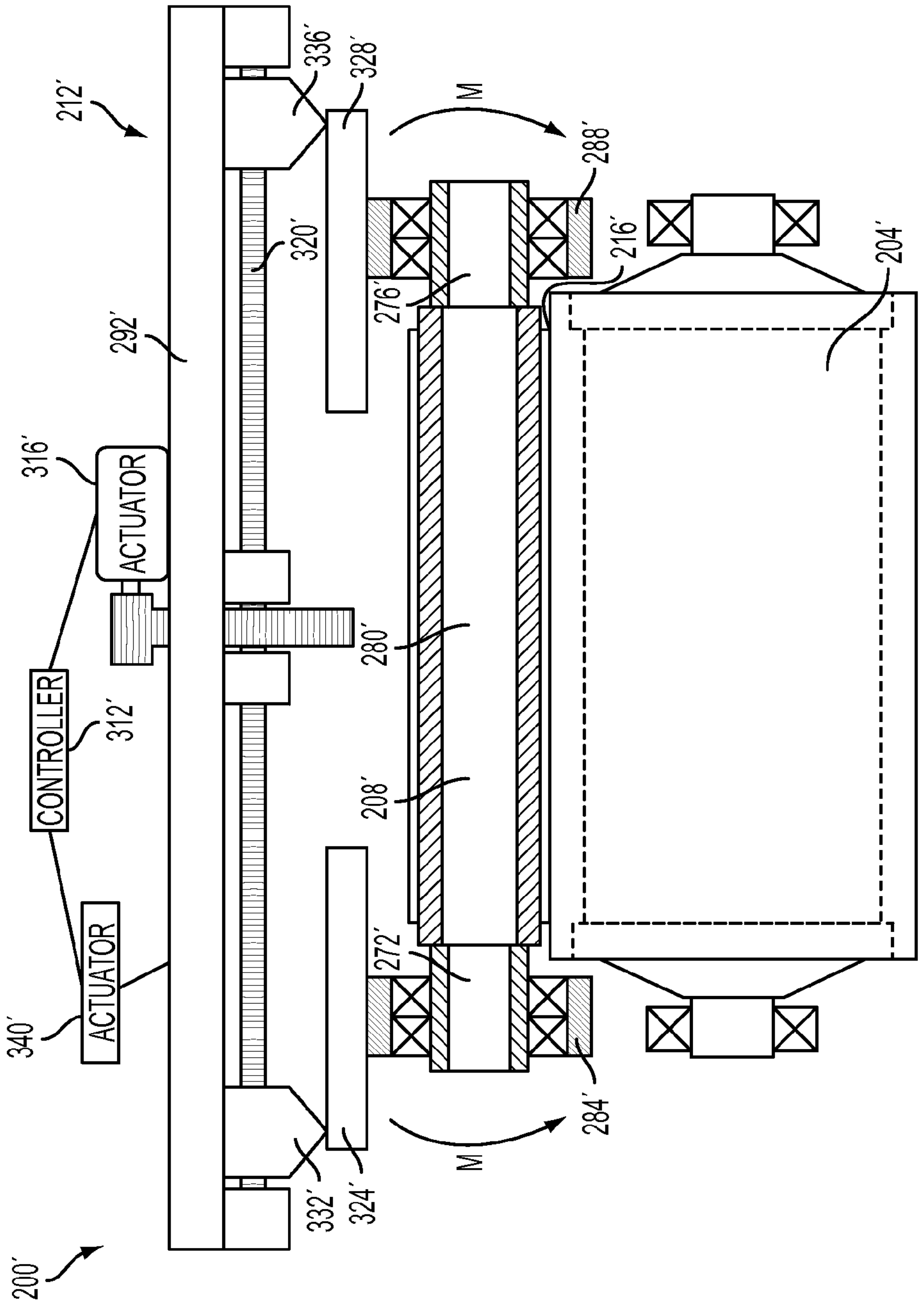
FIG. 5 depicts an alternative embodiment of the image transfer system of FIG. 1.

In an alternative embodiment, the image transfer system can include a support assembly that is not directly coupled to the transfix roller. For example, as illustrated in FIG. 5, the support assembly 212' includes a support member 292', a threaded beam 320', a first arm 324', a second arm 328', a first pressure applicator 332', and a second pressure applicator 336'. The image transfer system 200' of FIG. 5 is configured and operates in substantially the same manner as image transfer system 200 described above, except that the controller 312' operates an actuator 340' that is operatively connected to the threaded beam 320' to rotate the threaded beam 320' relative to the support member 292' and move the first and second pressure applicators 332', 336' along the first and second arms 324', 328', respectively. The controller 312' also operates a support member actuator 316' to apply downward pressure to the support member 292'.

The threaded beam 320' includes right-handed threads on one side and left-handed threads on the other side. The first and second pressure applicators 332' and 336' are positioned on opposite sides of the threaded beam 320' and configured to engage the threads to move when the threaded beam 320' is rotated. Accordingly, when the threaded beam 320' is rotated, the first and second pressure applicators 332' and 336' move in opposite directions along the threaded beam 320'. In this way, the threaded beam actuator 340' positions the first and second pressure applicators 332', 336' along the first and second arms 324', 328'.

In alternative embodiments, the first and second pressure applicators 332', 336' can be positioned along the first and second arms 324', 328' using alternative methods. For example, the first and second pressure applicators 332', 336' can be positioned along the first and second arms 324', 328' using solenoids or mechanical linkages, such as gear trains or the like.

The first arm 324' is fixedly coupled to the first pivotable collar 284' and the second arm 328' is fixedly coupled to the second pivotable collar 288'. Accordingly, the downward pressure applied to the support member 292' by the support member actuator 316' is applied to the first and second arms 324', 328' via the first and second pressure applicators 332', 336'. The downward pressure applied to the first and second arms 324', 328' is transferred to the first and second transfix roller ends 272', 276' by the first and second pivotable collars 284', 288'. The controller 312' applies moments M to the first and second transfix roller ends 272', 276' by operating the threaded beam actuator 340' to position the first and second pressure applicators 332', 336' along the first and second arms 324', 328' and then, once the first and second pressure applicators 332', 336 are positioned, operating the support member actuator 316' to apply downward pressure that is transferred to the first and second pivotable collars 284', 288'.

Figure 6:
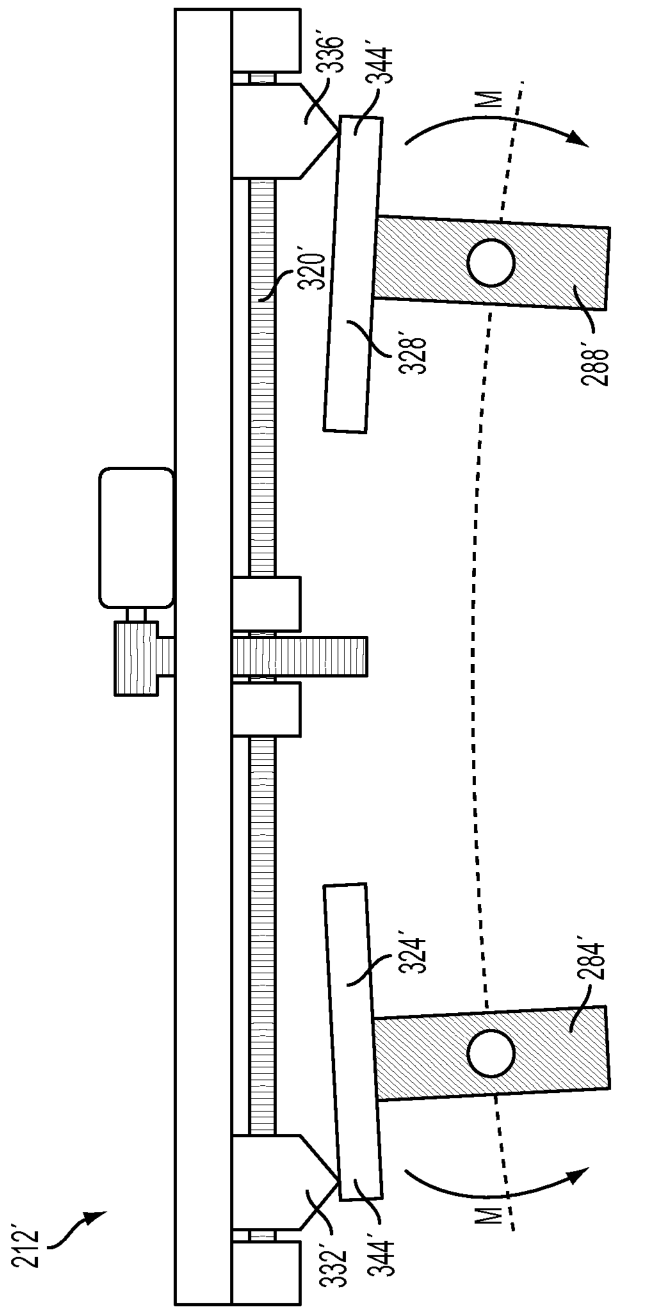
FIG. 6 depicts the support assembly configured to be used with the image transfer system of FIG. 5 in a concave position.

As shown in FIG. 6, rotating the threaded beam 320' to move the first and second pressure applicators 332', 336' toward the outward ends 344' of the first and second arms 324', 328' and then applying a downward pressure applies a moment to the first and second pivotable collars 284', 288' to bend the transfix roller 208' (shown in FIG. 5) into a concave position such that the first and second transfix roller ends 272', 276' (shown in FIG. 5) are closer to the image receiving member 204' (shown in FIG. 5) than the transfix roller central portion 280' (shown in FIG. 5). Accordingly, the pressure generated by the transfix roller 208' is greater at the ends of the nip 216' than in the middle.

Figure 7:
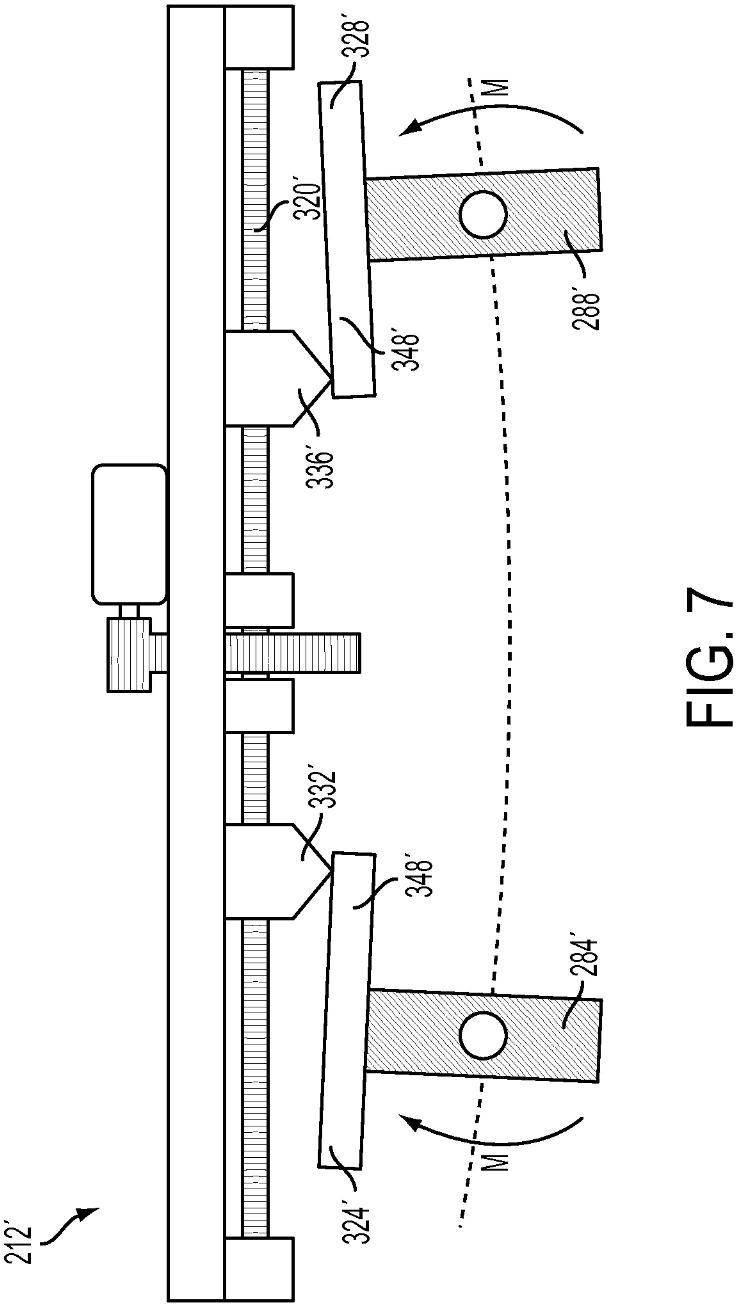
FIG. 7 depicts the support assembly configured to be used with the image transfer system of FIG. 5 in a convex position.

Conversely, as shown in FIG. 7, rotating the threaded beam 320' to move the first and second pressure applicators 332', 336' toward the inward ends 348' of the first and second arms 324', 328' and then applying a downward pressure applies a moment to the first and second pivotable collars 284', 288' to bend the transfix roller 208' (shown in FIG. 5) into a convex position such that the first and second transfix roller ends 272', 276' (shown in FIG. 5) are farther from the image receiving member 204' (shown in FIG. 5) than the transfix roller central portion 280' (shown in FIG. 5). Accordingly, the pressure generated by the transfix roller 208' is greater in the middle of the nip 216' than at the ends.

Figure 10:
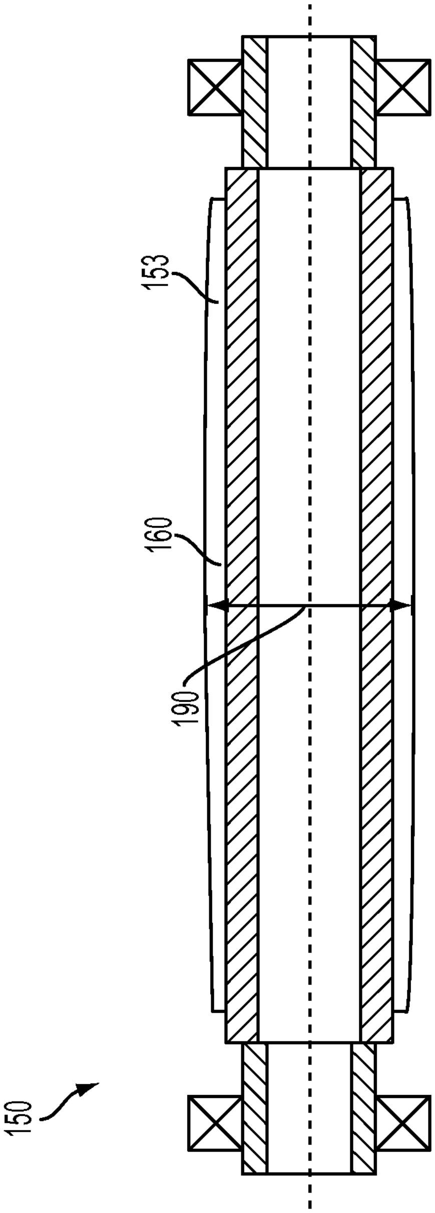
FIG. 10 PRIOR ART
FIG. 10 depicts a transfix roller having a crown.

In an alternative embodiment, the transfix roller 208' can include a crown in the elastomer coat, like that shown in FIG. 10. To compensate for the increased pressure at the middle of the nip 216' due to the inherent crown in the transfix roller 208', the support assembly 212' is configured to bend the transfix roller 208' only in the concave direction, as shown in FIG. 6.

In another alternative embodiment, the transfix roller 208' can include a flare in the elastomer coat. A flare is the inverse of a crown and forms a greater diameter on the ends of the transfix roller 208' than in the middle. To compensate for the increased pressure at the ends of the nip 216' due to the inherent flare in the transfix roller 208', the support assembly 212' is configured to bend the transfix roller 208' only in the convex direction, as shown in FIG. 7. Because the first and second pressure applicators 332', 336' are positioned toward the inward ends 348' to bend the transfix roller 208' in the convex direction, this configuration is advantageous for cases where there is little space for the image transfer system 200' within the printer beyond the ends of the transfix roller 208' because the threaded beam 320' need not extend beyond the first and second pivotable collars 284', 288'.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An indirect printer comprising:

a first roller;

a second roller having a first end and a second end, the second roller configured to move into and out of engagement with the first roller to apply pressure to the first roller;

a first pivotable collar supporting the first end of the second roller and configured to apply a first moment to the first end of the second roller; and a second pivotable collar supporting the second end of the second roller and configured to apply a second moment to the second end of the second roller.

2. The indirect printer of claim 1 further comprising:

a member having a first end that is operatively connected to the first pivotable collar and a second end that is operatively connected to the second pivotable collar; and an actuator operatively connected to the member and configured to operate the first and second ends of the member to move the first and second pivotable collars to apply the first and second moments to the first and second ends of the second roller.

3. The indirect printer of claim 2 wherein the member has a pivot between the first end of the member and the second end of the member.

4. The indirect printer of claim 3 wherein the actuator is operatively connected to the member at the pivot to move the first and second pivotable collars.

5. The indirect printer of claim 4 further comprising:

a controller operatively connected to the actuator and configured to operate the actuator to urge the pivot to change an angle between the first and second ends of the member.

6. The indirect printer of claim 5 the controller being further configured to identify a wrinkle parameter for an image to be printed and to operate the actuator with reference to the detected wrinkle parameter.

7. The indirect printer of claim 6 wherein at least one of the first roller and the second roller includes a cylindrical body having a thin wall.

8. The indirect printer of claim 1 further comprising:

a first arm fixedly coupled to the first collar;

a second arm fixedly coupled to the second collar;

a beam supporting a threaded bar;

a first actuator operatively connected to the threaded bar and configured to rotate the threaded bar relative to the beam;

a first pressure applicator in contact with the first arm, the first pressure applicator configured to slide along the threaded bar and the first arm as the threaded bar rotates; and a second pressure applicator in contact with the second arm, the second pressure applicator configured to slide along the threaded bar and the second arm as the threaded bar rotates.

9. The indirect printer of claim 8 wherein a first side of the threaded bar includes right-hand threads and a second side of the threaded bar includes left-hand threads, the first pressure applicator being rotatably coupled to one of the first side and the second side and the second pressure applicator being rotatably coupled to the other of the first side and the second side.

10. The indirect printer of claim 8 wherein the first actuator is configured to rotate the threaded bar to position the first pressure applicator along the first arm and to position the second pressure applicator along the second arm.

11. The indirect printer of claim 10 further comprising:

a second actuator operatively connected to the beam and configured to apply a pressure to the beam, the pressure passing through the first pressure applicator to the first arm and through the second pressure applicator to the second arm.

12. The indirect printer of claim 11 further comprising:

a controller operatively connected to the first actuator and the second actuator, the controller configured to operate the first actuator and the second actuator to rotate the threaded bar and to apply the pressure to the first and second arms.

13. The indirect printer of claim 12 the controller being further configured to identify a wrinkle parameter for an image to be printed on a specified media and to operate the first actuator and the second actuator with reference to the detected wrinkle parameter.

14. The indirect printer of claim 13 wherein at least one of the first roller and the second roller includes a cylindrical body having a thin wall.

15. A roller assembly for removable insertion in an indirect printer, the roller assembly comprising:

a thin wall roller having a first end and a second end;

a first pivotable collar supporting the first end of the roller and configured to apply a first moment to the first end of the roller;

a second pivotable collar supporting the second end of the roller and configured to apply a second moment to the second end of the roller; and an actuator operatively connected to the first collar and the second collar and configured to pivot the first collar and the second collar to apply the first and second moments to the first and second ends of the roller.

16. The roller assembly of claim 15 further comprising:

a member having a first end that is operatively connected to the first pivotable collar and a second end that is operatively connected to the second pivotable collar; and the actuator operatively connected to the member and configured to operate the first and second ends of the member to move the first and second collars to apply the first and second moments to the first and second ends of the roller.

17. The roller assembly of claim 16 wherein the member has a pivot between the first end and the second end of the member.

18. The roller assembly of claim 17 wherein the actuator is operatively connected to the member at the pivot to move the first and second pivotable collars.

19. The roller assembly of claim 18 wherein the actuator is configured to urge the pivot to change an angle between the first and second ends of the member.

20. The roller assembly of claim 15 further comprising:

a first arm fixedly coupled to the first collar;

a second arm fixedly coupled to the second collar;

a beam supporting a threaded bar;

a first actuator operatively connected to the threaded bar and configured to rotate the threaded bar relative to the beam;

a first pressure applicator in contact with the first arm, the first pressure applicator configured to slide along the threaded bar and the first arm as the threaded bar rotates; and a second pressure applicator in contact with the second arm, the second pressure applicator configured to slide along the threaded bar and the second arm as the threaded bar rotates.

21. The roller assembly of claim 20, further comprising:

a second actuator operatively connected to the beam and configured to apply a pressure to the beam, the pressure passing through the first pressure applicator to the first arm and through the second pressure applicator to the second arm.

* * * * *